US011126585B1

(12) United States Patent
Joyce et al.

(10) Patent No.: US 11,126,585 B1
(45) Date of Patent: Sep. 21, 2021

(54) DATA STORAGE DEVICE WITH IMPROVED INTERFACE TRANSMITTER TRAINING

(71) Applicant: Western Digital Technologies, Inc., San Jose, CA (US)

(72) Inventors: Brian Joyce, Rochester, MN (US); Mackenzie Roeser, Rochester, MN (US)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 0 days.

(21) Appl. No.: 16/812,549

(22) Filed: Mar. 9, 2020

(51) Int. Cl.
*G06F 13/42* (2006.01)
*G06F 3/0481* (2013.01)
*G06K 9/62* (2006.01)

(52) U.S. Cl.
CPC ...... *G06F 13/4282* (2013.01); *G06F 3/04812* (2013.01); *G06K 9/6256* (2013.01); *G06F 2213/0026* (2013.01)

(58) Field of Classification Search
CPC ............ G06F 13/4282; G06F 3/04812; G06F 2213/0026; G06K 9/6256
USPC ........................................ 710/5, 18, 33, 313
See application file for complete search history.

(56) References Cited

U.S. PATENT DOCUMENTS

| | | | | |
|---|---|---|---|---|
| 5,579,526 A | * | 11/1996 | Watt .................. | G06F 9/3867 396/559 |
| 5,619,532 A | * | 4/1997 | Tani ..................... | H04J 3/14 370/241 |
| 6,038,613 A | * | 3/2000 | Garcia ................. | G06F 3/0607 710/1 |
| 6,263,034 B1 | * | 7/2001 | Kanack .................... | G06F 1/10 331/14 |
| 8,000,384 B2 | | 8/2011 | Beukema et al. | |
| 8,897,352 B2 | | 11/2014 | Cha et al. | |
| 10,148,416 B2 | | 12/2018 | Morris et al. | |
| 10,248,591 B2 | | 4/2019 | Safranek et al. | |
| 10,331,585 B2 | | 6/2019 | Morris et al. | |
| 2002/0110200 A1 | * | 8/2002 | Doberenz .............. | H04L 27/22 375/324 |

(Continued)

FOREIGN PATENT DOCUMENTS

WO   2009003129 A2   12/2008

*Primary Examiner* — Idriss N Alrobaye
*Assistant Examiner* — Henry W Yu
(74) *Attorney, Agent, or Firm* — Patterson & Sheridan, LLP; Steven H. Versteeg

(57) ABSTRACT

The present disclosure generally relates to an interface transmitting training method and algorithm. The receiving device can train the transmitting device to choose the correct tap for transmitting from the transmitting device. During the training, the receiving device will send a request for a directional change tap. The transmitting device will note the request, but not act on the request. The receiving device will then send another request for a direction change tap. If the new request is for the same directional change tap as the previous request, and the number of consecutive identical directional change tap requests exceeds a predetermined threshold, the request is executed. By so doing, the effect of randomness for choosing the correct tap is minimized and the link is not degraded by transmitter training. As such, there is an overall improvement in the bit error rate and reliability of the serial interface.

20 Claims, 4 Drawing Sheets

(56) References Cited

U.S. PATENT DOCUMENTS

2003/0014734 A1\* 1/2003 Hartman ................. G06F 8/30
   717/125

\* cited by examiner

DATA STORAGE DEVICE WITH IMPROVED INTERFACE TRANSMITTER TRAINING

BACKGROUND OF THE DISCLOSURE

Field of the Disclosure

Embodiments of the present disclosure generally relate to interface transmitter training to ensure better connection between a host device and a data storage device.

Description of the Related Art

Many high-speed serial interfaces, such as SAS and PCIe, rely on far-end transmitter equalization training schemes to compensate for the signal loss over the longest channels. Because the training relies on detecting analog signal characteristics, the training is vulnerable to noise in pattern, channel, and integrated circuits.

SAS transmitter training, for example, allows a device to send out of band signals during link-up that change the link partner's transmission signal characteristics. Ideally, the transmission signal characteristics would be set to compensate for each particular environment, but the transmission signal characteristics currently do not compensate in such a manner.

When the noise reaches a certain threshold, the transmitter training requests are basically random rather than being specifically targeted to improve the link quality. The random transmitter training requests leads to the degradation of the link. Furthermore, the random transmitter training results in errors and other problems.

Therefore, there is a need in the art for more effective interface transmitter training.

SUMMARY OF THE DISCLOSURE

The present disclosure generally relates to an interface transmitting training method and algorithm. The receiving device can train the transmitting device to choose the correct tap for transmitting from the transmitting device. During the training, the receiving device will send a request for a directional change tap. The transmitting device will note the request, but not act on the request. The receiving device will then send another request for a direction change tap. If the new request is for the same directional change tap as the previous request, and the number of consecutive identical directional change tap requests exceeds a predetermined threshold, the request is executed. By so doing, the effect of randomness for choosing the correct tap is minimized and the link is not degraded by transmitter training. As such, there is an overall improvement in the bit error rate and reliability of the serial interface.

In one embodiment, a transmitting device comprises: an interface for connection to a receiving device; and a controller coupled to the interface, the controller is configured to: receive a request from the receiving device, wherein the request is for a directional change tap request for a first tap; make no change to the request; inform the receiving device that the directional change tap request has been executed; and execute the directional change tap request after informing the receiving device that the directional change tap has been executed.

In another embodiment, a data storage device comprises: an interface for connection to a host device; and a controller coupled to the interface, the controller is configured to: receive a first request from the host device for a directional change tap for a first tap; receive a second request from the host device for a directional change tap for the first tap; determine that the first request and the second request are identical; determine that a number of consecutive identical directional change tap requests exceeds a predetermined threshold, wherein the predetermined threshold is 2 or more; and execute the directional change tap for the first tap.

In another embodiment, a data storage device comprises: an interface for connection to a host device; and first means to execute a directional change tap request only after receiving a predetermined number of identical directional change tap requests, wherein the first means to execute is coupled to the interface.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to an interface transmitting training method and algorithm. The receiving device can train the transmitting device to choose the correct tap for transmitting from the transmitting device. During the training, the receiving device will send a request for a directional change tap. The transmitting device will note the request, but not act on the request. The receiving device will then send another request for a direction change tap. If the new request is for the same directional change tap as the previous request, and the number of consecutive identical directional change tap requests exceeds a predetermined threshold, the request is executed. By so doing, the effect of randomness for choosing the correct tap is minimized and the link is not degraded by transmitter training. As such, there is an overall improvement in the bit error rate and reliability of the serial interface.

Figure 1:
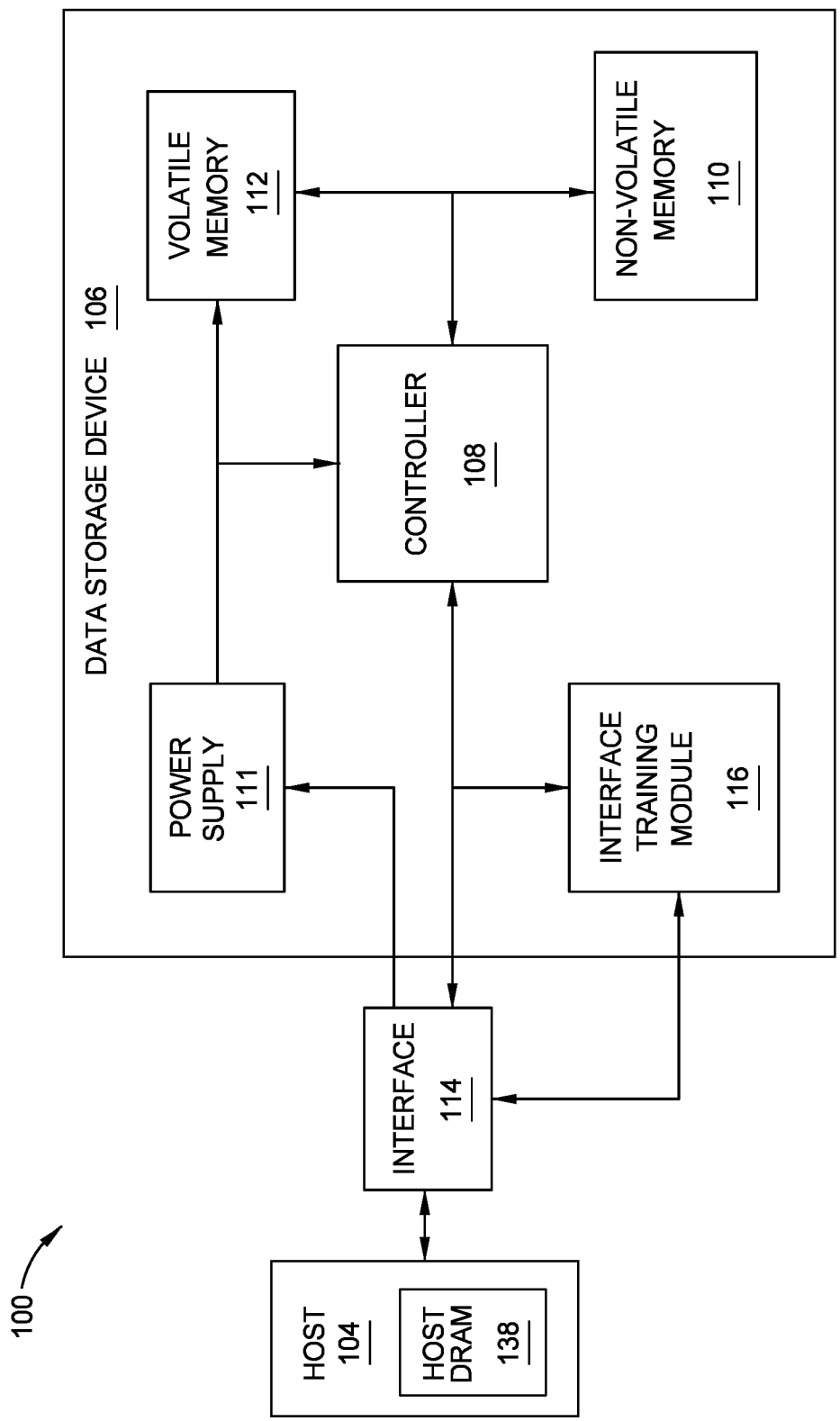
FIG. 1 is a schematic block diagram illustrating a storage system in which storage device may function as a storage device for a host device, in accordance with one or more techniques of this disclosure.

FIG. 1 is a schematic block diagram illustrating a storage system in which a storage device may function as a storage device for a host device, in accordance with one or more techniques of this disclosure. For instance, the host device 104 may utilize non-volatile memory devices 110 included in storage device 106 to store and retrieve data. The host device 104 comprises a host DRAM 138. In some examples, the storage system 100 may include a plurality of storage devices, such as the storage device 106, which may operate as a storage array. For instance, the storage system 100 may include a plurality of storage devices 106 configured as a redundant array of inexpensive/independent disks (RAID) that collectively function as a mass storage device for the host device 104.

The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

The storage device 106 includes a controller 108, non-volatile memory 110 (NVM 110), a power supply 111, volatile memory 112, an interface 114, and an interface training module 116. The controller 108 comprises an internal memory or buffer (not shown). In some examples, the storage device 106 may include additional components not shown in FIG. 1 for sake of clarity. For example, the storage device 106 may include a printed board (PB) to which components of the storage device 106 are mechanically attached and which includes electrically conductive traces that electrically interconnect components of the storage device 106, or the like. In some examples, the physical dimensions and connector configurations of the storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the storage device 106 may be directly coupled (e.g., directly soldered) to a motherboard of the host device 104.

The interface 114 of the storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: serial attached SCSI (SAS), serial-ATA (SATA), PCI express (PCIe), Universal Serial Bus (USB), 25 Gigabit Ethernet (25 GbE) or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. The interface 114 may be a type of connection unit to transfer data to the data storage device 106 from the host device 104, and vice-versa. Such connection units may be a USB-A connection, a USB-B connection, a mini USB-A connection, a mini USB-B connection, a micro USB-A connection, a micro USB-B connection, a USB-C connection, or a lightning connection. A backplane of printed circuit board materials such as FR4, or SAS cables, or a combination. The connection unit may comprise of several pins with a specialized usage. Furthermore, connection units are utilized for various purposes such as isochronous transfers, interrupt transfers, and bulk transfers. The term "bulk transfers" refers to large sporadic transfers using all remaining available bandwidth, but with no guarantees on bandwidth or latency. Bulk transfers are utilized when transferring files or data through a connection medium such as a USB cable. However, other methods of transferring data are available and the use of the term "USB cable" is not intended to be limiting.

For example, a USB-A connection has 4 pins. Each pin is utilized for a specific purpose, such as a supply voltage pin, a data (−) pin, a data (+) pin, and a supply voltage ground pin. Other connection units may have more than or less than 4 pins and each pin may have a different usage. In some examples, the electrical connection of the interface 114 may also permit the storage device 106 to receive power from the host device 104. For example, as illustrated in FIG. 1, the power supply 111 may receive power from the host device 104 via the interface 114.

Furthermore, the interface 114 and the controller 108 may be coupled with an interface training module 116. The interface training module 116 may be firmware and/or hardware designated to determine an optimal input channel of a connection between the host 104 and the data storage device 106. For example, in a 3 by 3 array, where each point is an input channel, 5 points out of the 9 points may be considered a good connection, whereas the remaining 4 points of the 9 points may be considered a bad connection. Furthermore, as will be discussed in more detail below, the interface training module 116 may utilize a filtering algorithm to only execute requests from the training partner of the device if that request has been made a set number of times in a row. The filtering algorithm may be denoted as "training" herein. Furthermore, the set number of times in a row is a threshold value or a predetermined number of identical requests. The previous example is not intended to be limiting, but to provide an example of a possible embodiment. The interface training module 116 may comprise of firmware that allows for better selection of an input channel.

The storage device 106 includes NVM 110, which may include a plurality of memory devices or memory units. NVM 110 may be configured to store and/or retrieve data. For instance, a memory unit of NVM 110 may receive data and a command from the controller 108 that instructs the memory unit to store the data. Similarly, the memory unit of NVM 110 may receive a command from the controller 108 that instructs the memory unit to retrieve data. In some examples, each of the memory units may be referred to as a die. In some examples, a single physical chip includes a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. Flash memory devices may include NAND or NOR based flash memory devices, and may store data based on a charge contained in a floating gate of a transistor for each flash memory cell. In NAND flash memory devices, the flash memory device may be divided into a plurality of blocks which may be divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Furthermore, NAND flash memory devices may be 2D or 3D devices, and may be single level cell (SLC), multi-level cell (MLC), triple level cell (TLC), or quad level cell (QLC). The controller 108 may write data to and read data from NAND flash memory devices at the page level and erase data from NAND flash memory devices at the block level.

The data storage device 106 includes a power supply 111, which provides power to one or more components of the storage device 106. When operating in a standard mode, the power supply 111 provides power to the one or more components using power provided by an external device, such as the host device 104. For instance, the power supply 111 provides power to the one or more components using power received from the host device 104 via the interface 114. In some examples, the power supply 111 includes one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may be comprised of one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory before sending the data to the NVM 110.

Figure 2:
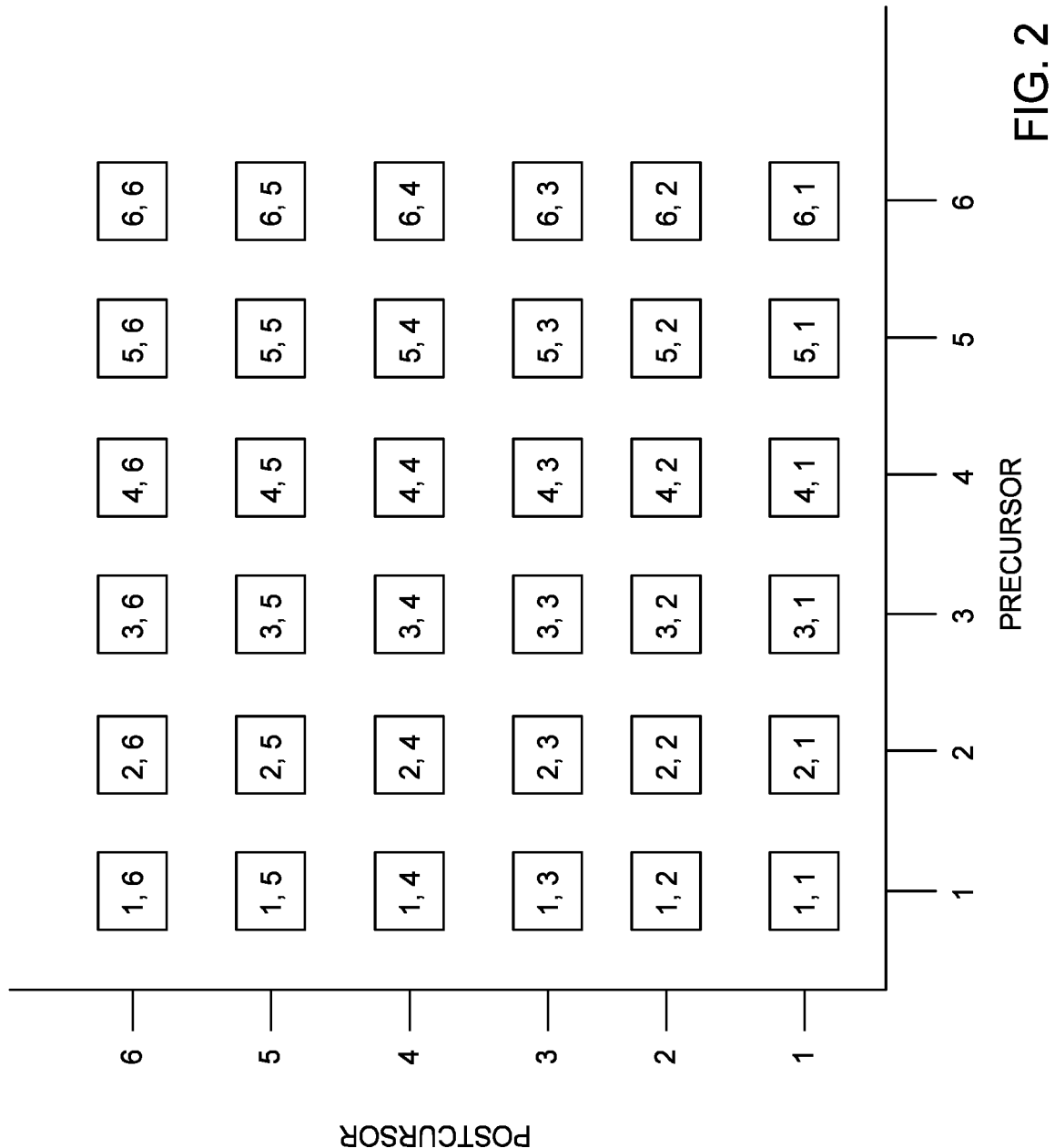
FIG. 2 is a schematic illustration of a transmitting connection grid, according to one embodiment.

FIG. 2 is a schematic illustration of a transmitting connection grid, according to one embodiment. The grid in FIG. 2 illustrates a 6 by 6 array, in which 36 connection points or input channels exists. However, the array of the transmitting connection grid is not intended to be limiting, but to provide an example of a possible embodiment. The x-axis position and the y-axis position designates each point. For example, point (3,4) is the intersection of x-axis equals 3 and y-axis equals 4. Furthermore, the x-axis is considered the precursor tap or C1 tap and the y-axis is considered the postcursor tap or C3 tap. The main tap is implicitly defined to maintain constant amplitude. In addition, two state machines may run in parallel, one for the C1 tap, denoted as precursor tap, and one for the C3 tap, denoted by the postcursor tap, where requests to the C2 tap are ignored since the main tap is implicitly defined.

For an array sized "x" by "y", a number "n" of good connection points or input channels may exist. Furthermore, a number "m" of bad connection points or input channels may exist. The total number of connection points is the sum of "n" and "m". In FIG. 2, "n" number of good connection points or input channels exists and "m" number of bad connection points or input channels exists. In addition, the good and bad connection points or input channels may be randomly scattered throughout the array or clustered together.

When a data storage device, such as the storage device 106 of FIG. 1, is connected to a host, such as the host 104 of FIG. 1, via an interface, such as the interface 114 of FIG. 1, the input channel or connection point may be randomly selected or set to a specific point in the array. For example, each time a storage device 106 is connected to a host 104, the connection point or input channel in the array is the same point, such as point (1,1), each time the connection occurs. In another example, each time a storage device 106 is connected to a host 104, the connection point or input point in the array is randomly selected each time the connection occurs.

Furthermore, each transmission may result in a request to move the connection point or input channel in a more favorable position. An interface training module, such as the interface training module 116 of FIG. 1, may be utilized to determine the optimal connection point or input channel of the transmission. The far-end transmitter equalization training scheme is utilized to compensate for signal loss over long channels. However, if the amount of noise exceeds a certain threshold, the transmitter training requests are more random, which may cause a distribution of transmissions through the entire array instead of a centralizing the transmissions to an optimal position. Because the transmissions are distributed through the entire array, the link quality is degraded and may result in errors and other problems not listed.

However, if the interface training module 116 is allowed to set criteria to filter the transmissions, the overall noise may be reduced. By reducing the noise, the distribution of transmissions in the array may be more centralized to an optimal point. By centralizing the transmissions to an optimal point, the bit error rate and reliability of the serial interface training may be improved.

Within the array, transmission requests affect the position of the input channel or connection point and are bound by the following two criteria: the transmission request may only move one step at a time and the transmission request may only move along the x-axis or the y-axis. The first criteria states that the transmission request may move the input channel or connection point one step at a time. Therefore, any transmission request may move the input channel or connection point to an adjacent point. The second criteria states that the transmission request may move the input channel or connection point along the x-axis (i.e., C1 tap) or the y-axis (i.e., C3 tap). Therefore, any transmission request may move the input channel or connection point horizontally or vertically along the array.

However, the interface training module will not execute a transmission request if the request is to move to a connection point or an input channel that is nonexistent at the edge or boundary of the array. For example, if a transmission request is received to move one step left from an initial connection point or input channel of (1,1), the request will not be executed since the point (0,1) does not exist in the array.

For the following example, the initial connection point or input channel is at point (4,4). Transmission requests to move the input channel or connection point to a new point such as (4,5), (3,4), (4,3), or (5,4) are valid and satisfies the two conditions. It is to be noted that the request to move to a new point, such as (4,5) from an old point, such as (3,4) involves two separate moves. The first move being to either (3,5) or (4,4) and then the second move to (5,4). The connection does not move diagonally in a single move. When the state machine of the controller, such as the controller 108 of FIG. 1, executes a transmission request, the change is also applied to the C2 tap. The relevant state machine associated with the transmission request is reset to the initial state.

Figure 3:
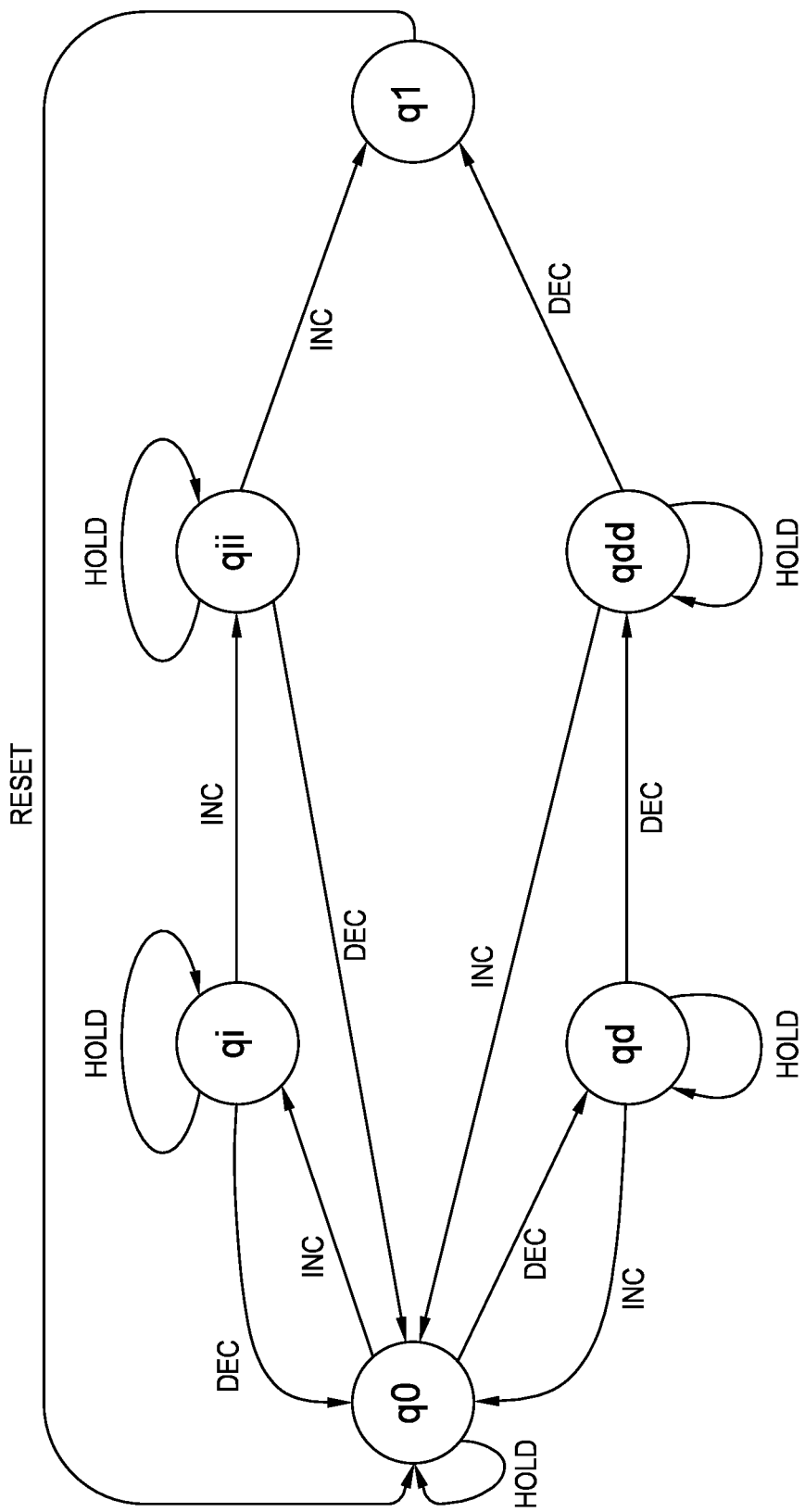
FIG. 3 is a schematic illustration of a training state machine, according to one embodiment.

FIG. 3 is a schematic illustration of a training state machine, according to one embodiment. The training state machine may be the interface training module 116 of FIG. 1. FIG. 2 may be the array of the training state machine of FIG. 3. The training state machine may be one of two state machines in parallel, either a state machine for the C1 tap or a state machine for the C3 tap. C1 tap refers to transmission requests to move an input channel or connection point one step in either horizontal position (i.e., one step left or one step right). C3 tap refers to transmission requests to move an input channel or connection point one step in either vertical position (i.e., one step up or one step down).

Furthermore, the training state machine utilizes an algorithm, where n=3, to incorporate averaging the transmission requests to better centralize an input channel or a connection point in order to filter out the noise. The letter "n" denotes a threshold value or a predetermined number of identical requests, where "n" is the number of identical requests that the interface training module 116 must receive before executing the transmission request. For example, when n=3, three requests of the same type must be received sequentially before the transmission request is executed. Each previous request before the threshold value is reached is held (i.e., ignored), unless a transmission request that resets the count is received. Requests in the horizontal direction are distinct from requests in the vertical direction. The value of "n" is not intended to be limiting and other values of "n" greater than 1 may be applicable.

Though a larger value of "n" may result in a greater averaging of the transmission requests and a lower noise received, the larger value of "n" may result in a decrease of efficiency of the training. For example, if multiple same transmission requests (i.e., "up", "up", "up") are received to move in the direction of a good input channel or connection point, but a transmission request in the opposite direction is received before the threshold value is reached, the process is interrupted and more than the necessary amount of transmission requests may be needed to reach a good input channel. Therefore, having too large of a value of "n" may decrease the efficiency of the training process. The value of "n" may be set by the transmitting device, such as the data storage device 106 of FIG. 1.

When an opposite request in either direction is received before the threshold value is reached (i.e., n=threshold value), the count resets. For example, the transmission requests are received in the following order of "up", "up", "down", and "up". Though three "up" requests are received, the count is reset when the "down" request is received because a different request in the x-axis was received before the threshold value was reached. The same process occurs in the y-axis direction. In another example, the transmission requests are received in the following order of "up", "up", "left", "up", "left", "down", and "left". The third "up" request and the third "left" request are executed because the requests of the horizontal axis and the vertical axis are independent of each other (i.e., transmission requests referring to C1 tap do not affect transmission requests referring to C3 tap) and the threshold value or predetermined number of identical requests have been received. However, the "down" request is not executed because the threshold has not been reached for the "down" request.

In FIG. 3, the state machine has not received any directional change tap requests at the "q0" state. The directional change tap requests may referred to as transmission requests, herein. The term "q0" may refer to the current position of the input channel or connection point when the storage device 106 is connected to the host device 104. The current position may be a transmitter initial point, such as point (4,4) of FIG. 2, may be a randomly selected point, which may be point (4,4) or any other point in the array, or may be the point that the last directional change tap location that was executed.

The term "INC" indicates an increase along the x-axis (i.e., x=5 to x=6) or the y-axis (i.e., y=5 to y=6), whereas the term "DEC" indicates a decrease along the x-axis (i.e., x=5 to x=4) or the y-axis (i.e., y=5 to y=4). Furthermore, the term "HOLD" represents a transmission request that is not to the same directional change tap request. For example, if the state machine is for C1 tap or the x-axis and a transmission request associated with a C3 tap or the y-axis is received, then the position in the state machine for the C1 tap or the x-axis does not change and is in a "HOLD" loop. "HOLD" may also represent a request to make no change.

The variable "q" represents the transmission request, where the denotation of a multiple of "i" or "d" refers to an identical transmission request. The variable "i" represents a directional change tap increase request, whereas the variable "d" represents a directional change tap decrease request. Multiple identical transmission requests received in succession, where C1 tap and C3 tap are independent of each other, are denoted by a multiple of the variables "i" and "d". For example, "qii" denotes that two identical directional change tap increase requests were received sequentially. Furthermore, "qdd" denotes that two identical directional change tap decrease requests were received sequentially. The maximum multiple of "i" and "d" can be calculated as follows: Maximum multiple of "i" or "d"=n−1.

When the state machine transitions to the "accept" state, denoted by "q1", the threshold value or the predetermined value of identical requests have been received. If both the threshold value is 3 (i.e., n=3) and three of the identical directional change tap requests have been received sequentially, the interface training module 116 executes the third directional change tap request and also applies the change to the C2 tap. After the directional change tap request is executed, the state machine resets to the "q0" state, denoted by the "RESET" curve.

In the following example, the state machine is for a directional change tap request is along the x-axis (C1 tap). However, the example may be utilized to describe a state machine for a directional change tap request along the y-axis (C3 tap). When the storage device 106 and the host 104 are connected via an interface 114, the connection point or input channel may be a preset point in the array or a randomly selected point in the array. The connection point or input channel in the array is point (4,4) of FIG. 2.

Before any transmission requests are received, both state machines for C1 tap and C3 tap are at state "q0". The interface training module 116 receives a first directional change tap increase request in the x-axis. Since the threshold value or predetermined number of identical requests value, n=3, has not been reached, the transmission request is acknowledged, but ignored. However, the corresponding state machine for C1 tap advances from state "q0" to state "qi". A second directional change tap increase request is received in the y-axis. The state "qi" is held in the state machine for C1 tap, while the state machine for C3 tap advances from state "q0" to state "qi". A third directional change tap increase request is received in the x-axis and the request is acknowledged, but ignored because the threshold value has not been reached. The corresponding state machine for C1 tap advances from state "qi" to state "qii".

A fourth directional change tap decrease request is received in the x-axis. Since a different request in the x-axis or C1 tap was issued, state of the state machine for C1 tap resets from state "qii" to state "q0". However, if the fourth directional change tap request corresponded to an increase, then the state machine advances from state "qii" to "q1". The directional change tap increase request is executed since the request satisfies the criteria of a threshold value or a predetermined number of identical requests. The new input channel or connection point is point (5,4) of FIG. 2.

Figure 4:
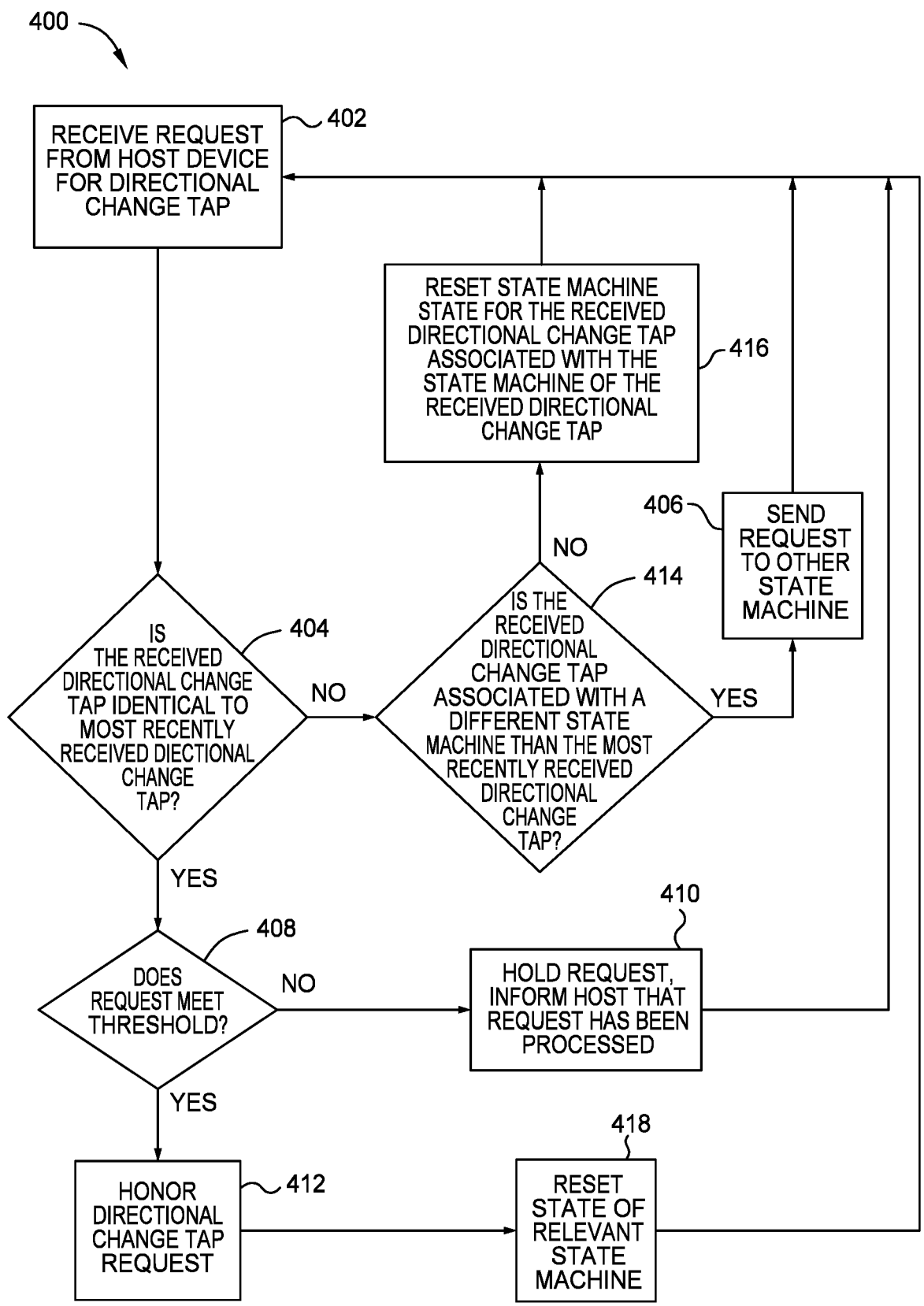
FIG. 4 is a flowchart illustrating a method of interface transmitter training, according to one embodiment.

FIG. 4 is a flowchart illustrating a method 400 of interface transmitter training, according to one embodiment. The method 400 may be applicable to the embodiments described in FIG. 2 and FIG. 3. The interface training module, such as the interface training module 116 of FIG. 1, may comprise of firmware and/or hardware to execute the method 400 of interface transmitter training. At block 402, the controller, such as the controller 108 of FIG. 1, receives a request from the host device, such as the host 104 of FIG. 1, for a directional change tap. The state of the state machine may be "q0", "qi", "qii", "qd", "qdd", "q1" or any other iteration of "qi" or "qd" as depicted in FIG. 3. The previous states listed are not intended to be limiting and other states may exist. The controller 108 relays the request to the interface training module 116 and determines if the directional change tap request received is identical to the most recently received directional change tap at block 404.

If the received directional change tap request is not identical to the most recently received directional change tap, the interface training module 116 determines if the received directional change tap is for a different state machine than the current state machine associated with the most recently received directional change tap at block 414. If the received directional change tap request is associated with a different state machine, then at block 406, the request determined by the other state machine.

However, if the received directional change tap is associated with the same state machine as the most recently received directional change tap at block 414, then the state machine state is reset (i.e., reset to state "q0" of FIG. 3) for the associated state machine at block 416. The interface training module 116 waits for a new directional change tap request to be received from the host at block 402.

If the directional change tap is identical to the most recently received directional change tap at block 404, then the controller 108 will utilize the interface training module 116 to determine if the request meets the threshold at block 408. The threshold value is considered the predetermined number of identical requests received. This value determines the number of filters that need to be satisfied before executing a request. The value may be any number larger than 1. However, too large of a value may decrease the sensitivity and not allow for improvement in the bit error rate and/or the reliability of the serial interface. The threshold value provides some amount of averaging so that not all requests are executed in order to minimize the noise of the transmission and decrease the randomness of the connection points or input channels throughout the array.

If the transmission request does not satisfy the threshold value requirement at block 408, then the interface training module 116 will make no change due to the request. The host 104 is informed that the request has been processed. The state of the state machine advances to the next state, such as state "qi" to "qii" of FIG. 3. The controller 108 waits until a new request is received for a directional change tap at block 402. However, the host 104 is informed that the request has been processed though the request has been ignored by the interface training module 116 at block 410. The interface training module 116 waits for a new request to be received at block 402. If the transmission request does satisfy the predetermined threshold value requirement at block 408, the transmission request is executed and the change is applied to the array and to the C2 tap at block 412. At block 418, the state machine state is reset from state "q1" to state "q0" as depicted in FIG. 3 when the request is executed. The interface training module 116 waits for a new request to be received at block 402.

The embodiments illustrated by the array of FIG. 2, the training state machine of FIG. 3, and the method 400 of interface transmitter training may be utilized to further explain the process of interface training module 116 training. Furthermore, directional change tap requests are listed in the order that they are received in the following examples. The threshold value or the predetermined number of identical requests value and the directional change tap requests may be different for other embodiments not listed.

In one embodiment, the threshold value or the predetermined number of identical requests value is 3 (i.e., n=3). Because the threshold value is 3, the flowchart of FIG. 3 will be used to illustrate the example. The initial connection point or input channel in this example is point (2,5) of FIG. 2. The following transmission requests are received by the controller 108 in the following order: "up", "down", "left", "left", "down", "left", "down", and "left". A first "up"

request is received and relayed to the interface training module 116. This step corresponds with block 402 of method 400. The interface training module 116 ignores the request and holds it at a first state machine state "q0".

A second transmission request "down" is received by the controller 108 and relayed to the interface training module 116. The interface training module 116 determines if the request is the same as the previous request "up" at block 404 of method 400 and determines if the request is for a different state machine at block 414. Because the request is not the same as the previous request, but for the same state machine, the first state machine is reset at block 416 of method 400 to a state "q0". Though the request has not been executed in the array, the transmitter acknowledges to the receiver that the request has been executed.

A third transmission request "left" is received by the controller 108 and relayed to the interface training module 116. The interface training module 116 determines if the request is the same as the previous request "down" at block 404 of method 400 and determines if the request is for a different state machine at block 414. Because the x-axis and the y-axis have different state machines, hence the C1 tap for the x-axis and the C3 tap for the y-axis, the "left" request is for a different state machine than the previous request of "down". A second state machine, associated with the C1 tap of the x-axis, state is decreased from state "q0" to state "qd". Though the request has not been executed in the array, the transmitter acknowledges to the receiver that the request has been executed.

A fourth transmission request "left" is received by the controller 108 and relayed to the interface training module 116. The interface training module 116 determines if the request is the same as the previous request "left" at block 404 of method 400 and determines if the request is for a different state machine at block 414. Since the request is the same as the most recently received directional change tap for the relevant state machine, the interface training module determines if the request satisfies the threshold value requirement at block 408 of method 400.

Because the fourth transmission request corresponding with a "left" request does not satisfy the threshold value requirement of 3, the position of the current input channel or connection point does not change and the request is ignored and held. Though the request has not been executed in the array, the transmitter acknowledges to the receiver that the request has been executed. However, the state of a second state machine increases from state "qd" to state "qdd".

A fifth transmission request "down" is received by the controller 108 and relayed to the interface training module 116. The interface training module 116 determines if the request is the same as the previous request "left" at block 404 of method 400 and determines if the request is for a different state machine at block 414. Because the x-axis and the y-axis have different state machines, hence the C1 tap for the x-axis and the C3 tap for the y-axis, the "down" request is a different state machine than the previous request of "left". However, the transmission request of "down" is identical to the previous directional change tap request for a first state machine. A first state machine, associated with the C3 tap of the y-axis, state is decreased from state "q0" to state "qd". Though the request has not been executed in the array, the transmitter acknowledges to the receiver that the request has been executed.

A sixth transmission request "left" is received by the controller 108 and relayed to the interface training module 116. The interface training module 116 determines if the request is the same as the previous request "down" at block 404 of method 400 and determines if the request is for a different state machine at block 414. Since the request is the same as the most recently received directional change tap for the relevant state machine, the interface training module determines if the request satisfies the threshold value requirement at block 408 of method 400.

Because the sixth transmission request corresponding with a "left" request satisfies the threshold value requirement of 3, the position of the current input channel or connection point changes from point (2,5) to point (1,5) of FIG. 2. The state of a second state machine increases from state "qdd" to state "q1". Afterwards, the state of a second state machine is reset to state "q0" at block 418 of FIG. 4. The count for the threshold value resets for the relevant state machine.

A seventh transmission request "down" is received by the controller 108 and relayed to the interface training module 116. The interface training module 116 determines if the request is the same as the previous request "left" at block 404 of method 400 and determines if the request is for a different state machine at block 414. Since the request is the same as the most recently received directional change tap for the relevant state machine (i.e., a first state machine for the y-axis or C3 tap), the interface training module determines if the request satisfies the threshold value requirement at block 408 of method 400.

Because the seventh transmission request corresponding with a "down" request satisfies the threshold value requirement of 3, the position of the current input channel or connection point changes from point (1,5) to point (1,4) of FIG. 2. The state of a first state machine increases from state "qdd" to state "q1". Afterwards, the state of a second state machine is reset to state "q0" at block 418 of FIG. 4. The count for the threshold value resets for the relevant state machine.

An eighth transmission request "left" is received by the controller 108 and relayed to the interface training module 116. However, the transmission request is ignored due to a boundary condition (i.e., no points exist in the array less than y=1 and x=1). As more directional change tap requests are received, the algorithm to average the requests centralizes the connections to a certain input channel or connection point in the array. The algorithm to average the requests may decrease the randomness of where the input channel or connection point is located within the array. Thus, the reliability of the serial interface and the bit error rate may be improved.

In another embodiment, the threshold value or the predetermined number of identical requests value is 4 (i.e., n=4). Because the threshold value is 4, parts of the flowchart of FIG. 3 will be used to illustrate the example. The initial connection point or input channel in this example is point (2,5) of FIG. 2. The following transmission requests are received by the controller 108 in the following order: "up", "down", "left", "left", "down", "left", "down", and "left". A first "up" request is received and relayed to the interface training module 116. This step corresponds with block 402 of method 400. The interface training module 116 ignores the request and holds it at a first state machine state "q0".

A second transmission request "down" is received by the controller 108 and relayed to the interface training module 116. The interface training module 116 determines if the request is the same as the previous request "up" at block 404 of method 400 and determines if the request is for a different state machine at block 414. Because the request is not the same as the previous request, but for the same state machine, the first state machine is reset at block 416 of method 400 to a state "q0". Though the request has not been executed in the array, the transmitter acknowledges to the receiver that the request has been executed. It is contemplated that when the state machine is reset at block 416 of method 400 that the state with automatically transition to state "qi" after being reset to "q0".

A third transmission request "left" is received by the controller 108 and relayed to the interface training module 116. The interface training module 116 determines if the request is the same as the previous request "down" at block 404 of method 400 and determines if the request is for a different state machine at block 414. Because the x-axis and the y-axis have different state machines, hence the C1 tap for the x-axis and the C3 tap for the y-axis, the "left" request is for a different state machine than the previous request of "down". A second state machine, associated with the C1 tap of the x-axis, state is decreased from state "q0" to state "qd". Though the request has not been executed in the array, the transmitter acknowledges to the receiver that the request has been executed.

A fourth transmission request "left" is received by the controller 108 and relayed to the interface training module 116. The interface training module 116 determines if the request is the same as the previous request "left" at block 404 of method 400 and determines if the request is for a different state machine at block 414. Since the request is the same as the most recently received directional change tap for the relevant state machine, the interface training module determines if the request satisfies the threshold value requirement at block 408 of method 400.

Because the fourth transmission request corresponding with a "left" request does not satisfy the threshold value requirement of 3, the position of the current input channel or connection point does not change and the request is ignored and held. Though the request has not been executed in the array, the transmitter acknowledges to the receiver that the request has been executed. However, the state of a second state machine increases from state "qd" to state "qdd".

A fifth transmission request "down" is received by the controller 108 and relayed to the interface training module 116. The interface training module 116 determines if the request is the same as the previous request "left" at block 404 of method 400 and determines if the request is for a different state machine at block 414. Because the x-axis and the y-axis have different state machines, hence the C1 tap for the x-axis and the C3 tap for the y-axis, the "down" request is a different state machine than the previous request of "left". However, the transmission request of "down" is identical to the previous directional change tap request for a first state machine. A first state machine, associated with the C3 tap of the y-axis, state is decreased from state "q0" to state "qd". Though the request has not been executed in the array, the transmitter acknowledges to the receiver that the request has been executed.

A sixth transmission request "left" is received by the controller 108 and relayed to the interface training module 116. The interface training module 116 determines if the request is the same as the previous request "down" at block 404 of method 400 and determines if the request is for a different state machine at block 414. Because the x-axis and the y-axis have different state machines, hence the C1 tap for the x-axis and the C3 tap for the y-axis, the "left" request is for a different state machine than the previous request of "down". A second state machine, associated with the C1 tap of the x-axis, state is decreased from state "qdd" to state "qddd" (not shown in FIG. 3). Though the request has not been executed in the array, the transmitter acknowledges to the receiver that the request has been executed.

A seventh transmission request "down" is received by the controller 108 and relayed to the interface training module 116. The interface training module 116 determines if the request is the same as the previous request "left" at block 404 of method 400 and determines if the request is for a different state machine at block 414. Because the x-axis and the y-axis have different state machines, hence the C1 tap for the x-axis and the C3 tap for the y-axis, the "down" request is a different state machine than the previous request of "left". However, the transmission request of "down" is identical to the previous directional change tap request for a first state machine. A first state machine, associated with the C3 tap of the y-axis, state is decreased from state "qdd" to state "qddd". Though the request has not been executed in the array, the transmitter acknowledges to the receiver that the request has been executed.

An eighth transmission request "left" is received by the controller 108 and relayed to the interface training module 116. Since the request is the same as the most recently received directional change tap for the relevant state machine, the interface training module determines if the request satisfies the threshold value requirement at block 408 of method 400. Because the eighth transmission request corresponding with a "left" request satisfies the threshold value requirement of 4, the position of the current input channel or connection point changes from point (2,5) to point (1,5) of FIG. 2. The state of a second state machine increases from state "qddd" (not shown in FIG. 3) to state "q1". Afterwards, the state of a second state machine is reset to state "q0" at block 418 of FIG. 4. The count for the threshold value resets for the relevant state machine. As more directional change tap requests are received, the algorithm to average the requests centralizes the connections to a certain input channel or connection point in the array. The algorithm to average the requests may decrease the randomness of where the input channel or connection point is located within the array. Thus, the reliability of the serial interface and the bit error rate may be improved.

In another embodiment, the threshold value or the predetermined number of identical requests value is 2 (i.e., n=2). Because the threshold value is 2, parts of the flowchart of FIG. 3 will be used to illustrate the example. The initial connection point or input channel in this example is point (2,5) of FIG. 2. In order to reach a connection point or input channel that may be considered a good connection in the array, such as point (3,3) of FIG. 2, several transmission requests may be needed. The requirement of 2 identical transmission requests in a row for the same state machine will also be required. In order to reach a connection point or input channel in the array such as point (3,3) from a point (2,5), one set of two "right" transmission requests must be received sequentially for a second state machine and two sets of two "down" transmission requests must be received sequentially for a first state machine. However, more than the listed sets may be required as two "left" transmission requests or two "up" transmission requests will move the location of the connection point or the input channel in the opposite direction of the point (3,3) of FIG. 2.

By ignoring a directional change tap request until a predetermined number of identical directional change tap requests have been consecutively received, the transmitting device can train the receiving device to have a highly reliable serial interface with low bit error rate and less link degradation.

In one embodiment, a transmitting device comprises: an interface for connection to a receiving device; and a controller coupled to the interface, the controller is configured to: receive a request from the receiving device, wherein the request is for a directional change tap request for a first tap; make no change due to the request; inform the receiving device that the directional change tap request has been executed; and execute the directional change tap request after informing the receiving device that the directional change tap has been executed. The controller is further configured to make no change due to the request until a predetermined number of identical requests have been received. The controller is further configured to continue to make no change when another request is received from the receiving device, wherein the another request is for a directional change tap for a second tap different from the first tap. The controller is further configured to repeat the receiving, making no change, and informing at least once prior to executing the directional change tap. The controller is further configured to determine that a directional change tap received for the first tap is identical at least two times consecutively. The executing occurs after the determining. The controller is further configured to receive a directional change tap for a second tap different from the first tap prior to receiving the second directional change tap for the first tap.

In another embodiment, a data storage device comprises: an interface for connection to a host device; and a controller coupled to the interface, the controller is configured to: receive a first request from the host device for a directional change tap for a first tap; receive a second request from the host device for a directional change tap for the first tap; determine that the first request and the second request are identical; determine that a number of consecutive identical directional change tap requests exceeds a predetermined threshold, wherein the predetermined threshold is 2 or more; and execute the directional change tap for the first tap. The controller is further configured to: receive a third request from the host device for a directional change tap for a second tap; receive a fourth request from the host device for a directional change tap for the second tap; determine that the third request and the fourth request are identical; determine that a number of consecutive identical directional change tap requests exceeds a predetermined threshold, wherein the predetermined threshold is 2 or more; and execute the directional change tap for the second tap. The controller is further configured to receive the third request prior to the second request. The controller is further configured to: receive a fifth request from the host device for a directional change tap for a first tap; receive a sixth request from the host device for a directional change tap for the first tap; and determine that the fifth request and the sixth request are not identical. The controller is further configured to make no change based on the fifth request until after the sixth request is received. The controller is further configured to inform the host device that the fifth request has been executed. The controller is further configured to: not execute the first request; and inform the host device that the first request has been executed.

In another embodiment, a data storage device comprises: an interface for connection to a host device; and first means to execute a directional change tap request only after receiving a predetermined number of identical directional change tap requests, wherein the first means to executed is coupled to the interface. The device further comprises first means to ignore a directional change tap request. The device further comprises first means to determine that a consecutive number of identical change tap requests have been received. The device further comprises second means to execute a directional change tap request only after receiving a predetermined number of identical directional change tap requests, wherein the second means to execute is coupled to the interface. The device further comprises first means to ignore a directional change tap request; and second means to ignore a directional change tap request, wherein the first means and the second means are different. The device further comprises first means to determine that a consecutive number of identical change tap requests have been received; and second means to determine that a consecutive number of identical change tap requests have been received.

While the foregoing is directed to embodiments of the present disclosure, other and further embodiments of the disclosure may be devised without departing from the basic scope thereof, and the scope thereof is determined by the claims that follow.

What is claimed is:

1. A transmitting device, comprising:
an interface for connection to a receiving device, wherein the connection comprises an input channel; and
a controller coupled to the interface and an interface training module, wherein the interface training module is a state machine system, wherein the state machine system comprises a first state machine and a second state machine, and wherein the controller is configured to:
  receive a request from the receiving device, wherein the request is for a directional change tap request for a first tap, wherein the directional change tap comprises moving the input channel of the first state machine stepwise along an x-axis or moving the input channel of the second state machine stepwise along a y-axis;
  forward the request to the interface training module;
  make no change based on the request;
  inform the receiving device that the directional change tap request has been executed upon determining that a predetermined number of consecutive identical requests for the x-axis or the y-axis has been received; and
  execute the directional change tap request after informing the receiving device that the directional change tap has been executed.

2. The device of claim 1, wherein the controller is further configured to make no change based on the request until the predetermined number of consecutive identical requests have been received.

3. The device of claim 1, wherein controller is further configured to continue to make no change based on the request when another request is received from the receiving device, wherein the another request is for a directional change tap for a second tap different from the first tap.

4. The device of claim 1, wherein the controller is further configured to repeat the receiving, making no change based on, and informing at least once prior to executing the directional change tap.

5. The device of claim 4, wherein the controller is further configured to determine that a directional change tap received for the first tap is identical at least two times consecutively.

6. The device of claim 5, wherein the executing occurs after the determining.

7. The device of claim 6, wherein the controller is further configured to receive a directional change tap for a second tap different from the first tap prior to receiving the second directional change tap for the first tap.

8. A data storage device, comprising:
an interface for connection to a host device, wherein the connection comprises an input channel; and
a controller coupled to the interface and an interface training module, wherein the interface training module is a state machine system, wherein the state machine system comprises a first state machine and a second state machine, and wherein the controller is configured to:
receive a first request from the host device for a directional change tap for a first tap, wherein the directional change tap comprises moving the input channel of the first state machine stepwise along an x-axis or moving the input channel of the second state machine stepwise along a y-axis;
receive a second request from the host device at the interface training module for a directional change tap for the first tap, wherein the second request is on a same axis as the first request;
determine that the first request and the second request of the same axis are identical;
determine that a number of consecutive identical directional change tap requests exceeds a predetermined threshold, wherein the predetermined threshold is 2 or more; and
execute the directional change tap for the first tap.

9. The device of claim 8, wherein the controller is further configured to:
receive a third request from the host device for a directional change tap for a second tap;
receive a fourth request from the host device for a directional change tap for the second tap;
determine that the third request and the fourth request are identical;
determine that a number of consecutive identical directional change tap requests exceeds a predetermined threshold, wherein the predetermined threshold is 2 or more; and
execute the directional change tap for the second tap.

10. The device of claim 9, wherein the controller is further configured to receive the third request prior to the second request.

11. The device of claim 8, wherein the controller is further configured to:
receive a fifth request from the host device for a directional change tap for a first tap;
receive a sixth request from the host device for a directional change tap for the first tap; and
determine that the fifth request and the sixth request are not identical.

12. The device of claim 11, wherein the controller is further configured to make no change based on the fifth request until after the sixth request is received.

13. The device of claim 12, wherein the controller is further configured to inform the host device that the fifth request has been executed.

14. The device of claim 8, wherein the controller is further configured to:
not execute the first request; and
inform the host device that the first request has been executed.

15. A data storage device, comprising:
an interface for connection to a host device, wherein the connection comprises an input channel; and
first means to execute a directional change tap request only after receiving a predetermined number of identical directional change tap requests at an interface training module, wherein:
the first means to execute is coupled to the interface;
the interface training module is a state machine system;
the state machine system comprises a first state machine and a second state machine; and
the directional change tap comprises moving the input channel of the first state machine stepwise along an x-axis or moving the input channel of the second state machine stepwise along a y-axis.

16. The device of claim 15, further comprising first means to ignore a directional change tap request.

17. The device of claim 15, further comprising first means to determine that a consecutive number of identical change tap requests have been received.

18. The device of claim 15, further comprising second means to execute a directional change tap request only after receiving a predetermined number of identical directional change tap requests, wherein the second means to execute is coupled to the interface.

19. The device of claim 18, further comprising:
first means to ignore a directional change tap request; and
second means to ignore a directional change tap request, wherein the first means and the second means are different.

20. The device of claim 19, further comprising:
first means to determine that a consecutive number of identical change tap requests have been received; and
second means to determine that a consecutive number of identical change tap requests have been received.

* * * * *